United States Patent
Fuchs et al.

(10) Patent No.: US 9,293,965 B2
(45) Date of Patent: Mar. 22, 2016

(54) APPARATUS, SYSTEM, AND METHOD FOR COOLING AN ELECTRIC MOTOR

(71) Applicant: GM GLOBAL TECHNOLOGY OPERATIONS LLC, Detroit, MI (US)

(72) Inventors: Micah Joel Fuchs, Ithaca, NY (US);
Paul F. Turnbull, Canton, MI (US);
Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 415 days.

(21) Appl. No.: 13/959,185

(22) Filed: Aug. 5, 2013

(65) Prior Publication Data
US 2015/0035391 A1 Feb. 5, 2015

(51) Int. Cl.
*H02K 9/00* (2006.01)
*H02K 9/19* (2006.01)

(52) U.S. Cl.
CPC ........................................ *H02K 9/19* (2013.01)

(58) Field of Classification Search
CPC ........................................................ H02K 9/19
USPC ........................................ 310/52–54, 58–59
See application file for complete search history.

(56) References Cited

U.S. PATENT DOCUMENTS

| | | | | |
|---|---|---|---|---|
| 3,968,388 A | * | 7/1976 | Lambrecht | H02K 9/005 174/DIG. 21 |
| 2004/0134693 A1 | * | 7/2004 | Yamagishi | F16H 57/0476 180/65.1 |
| 2006/0113851 A1 | * | 6/2006 | Ishihara | H02K 9/20 310/52 |
| 2007/0164618 A1 | * | 7/2007 | Koyama | H02K 9/19 310/54 |
| 2009/0256433 A1 | * | 10/2009 | Stiesdal | H02K 1/20 310/54 |
| 2010/0264760 A1 | * | 10/2010 | Matsui | H02K 9/19 310/54 |
| 2011/0084561 A1 | * | 4/2011 | Swales | H02K 9/19 310/54 |
| 2011/0156509 A1 | * | 6/2011 | Minemura | H02K 9/19 310/54 |
| 2011/0316367 A1 | * | 12/2011 | Takahashi | H02K 9/19 310/54 |

\* cited by examiner

*Primary Examiner* — Thanh Lam
(74) *Attorney, Agent, or Firm* — Quinn Law Group, PLLC

(57) ABSTRACT

An apparatus for providing a coolant to a stator and a rotor of an electric motor in a vehicle having a coolant pump is provided. The apparatus includes a base defining a plurality of first openings through at least one of which the coolant is flowable to the stator. The apparatus also includes at least one wall extending from the base to define a cavity configured to receive the coolant from the coolant pump. The apparatus further includes at least one first raised member within the cavity that extends from the base. The at least one first raised member defines at least one second opening substantially aligned with one of the first openings to form a first passageway through which the coolant is flowable to the rotor. The apparatus may be located above the electric motor such that the coolant is flowable by gravity to the stator and/or the rotor.

15 Claims, 2 Drawing Sheets

APPARATUS, SYSTEM, AND METHOD FOR COOLING AN ELECTRIC MOTOR

TECHNICAL FIELD

The present invention relates to an apparatus, a system, and a method for cooling an electric motor by providing a coolant to a stator and a rotor of the electric motor.

BACKGROUND

Electric vehicles, including hybrid vehicles, employ electric motors, such as induction motors and permanent magnet motors, to propel the vehicles, as well as to capture braking energy when acting as an electric generator. The electric motor generally includes a rotor, which transmits torque through a gear set to the drive wheels of the vehicle, and a stator, which contains conductors in the form of motor windings. When in operation, the stator and the rotor generally require cooling, which is typically achieved by providing a coolant, such as oil, to the stator (stator flow) and the rotor (rotor flow). While the stator flow is always required when the electric motor is in operation, the rotor flow is not, and as such, the coolant is provided to the stator and rotor separately.

SUMMARY

An apparatus for providing a coolant to a stator and a rotor of an electric motor in a vehicle is provided. The vehicle has a coolant pump. The apparatus includes a base and at least one wall extending from the base. The base defines a plurality of first openings through at least one of which the coolant is flowable to the stator. The base and the at least one wall define a cavity that is configured to receive the coolant from the coolant pump.

The apparatus also includes at least one first raised member within the cavity that extends from the base. The at least one first raised member defines at least one second opening that is substantially aligned with one of the first openings to form at least one first passageway. The coolant is flowable through the at least one first passageway to the rotor.

A system for providing a coolant to a stator and a rotor of an electric motor in a vehicle is also provided. The system includes a coolant pump, the apparatus described above, and a controller. The coolant pump is configured to supply the coolant to the cavity of the apparatus such that the coolant is at a coolant level within the cavity. The coolant pump has a speed that is adjustable. The controller is configured to adjust the speed of the coolant pump based on at least one parameter such that the coolant level within the cavity is variable.

A method for providing a coolant to a stator and a rotor of an electric motor in a vehicle via the system described above is further provided. The method includes first determining a temperature of the electric motor. The method then includes determining whether the temperature of the electric motor is below or above a threshold temperature.

If the temperature is below the threshold temperature, the method then includes setting the coolant pump to a low speed setting such that the coolant supplied to the apparatus fills the cavity to a coolant level that does not exceed the at least one first raised member. This allows the coolant to flow by gravity to only the stator through the plurality of first openings defined by the base of the apparatus.

If the temperature is above the threshold temperature, the method then includes setting the coolant pump to a high speed setting such that the coolant level within the cavity is above the at least one first raised member. This allows the coolant to flow by gravity to both the stator and the rotor through the plurality of first openings and the at least one first passageway, respectively.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
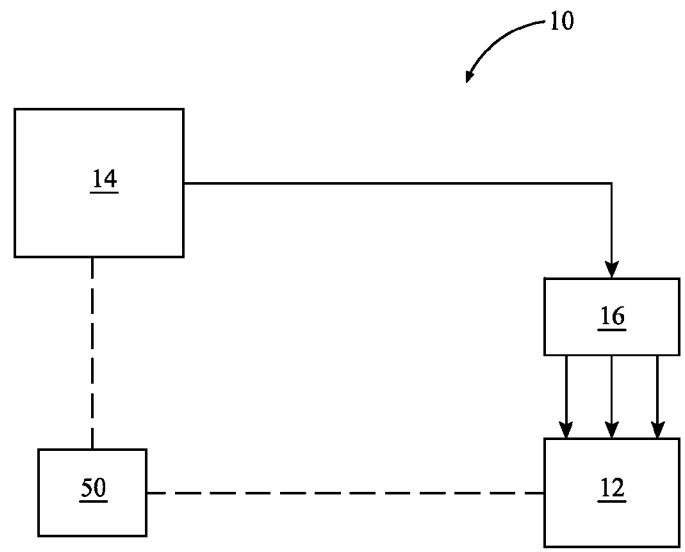
FIG. 1 is a schematic, block diagram of a system for cooling an electric motor via an apparatus.
Figure 2:
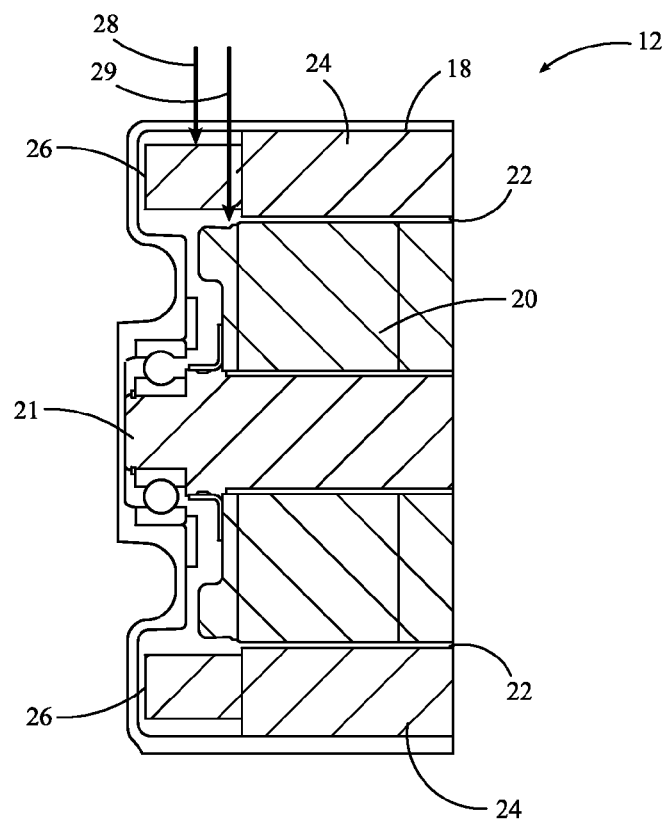
FIG. 2 is a schematic, fragmentary cross-sectional view of the electric motor of FIG. 1.

Referring to the drawings, wherein like reference numbers correspond to like or similar components wherever possible throughout the several figures, a system 10 for cooling an electric motor 12 is shown in FIG. 1. The system 10 includes a coolant pump 14 and an apparatus 16. The coolant pump 14 is configured to supply a coolant to the apparatus 16, which in turn routes the coolant to the electric motor 12, specifically to a stator 18 and a rotor 20 of the electric motor 12, as seen in FIG. 2 and described in more detail hereinafter. The apparatus 16 is located above the electric motor 12 such that the coolant flows by gravity from the apparatus 16 to the electric motor 12. The coolant pump 14 may be variable speed such that it may vary the amount of coolant supplied to the apparatus 16 based on certain parameters, such as temperature of the electric motor 12, as described in more detail hereinafter. In one embodiment, the coolant may be oil, and the coolant pump 14 may be an oil pump Referring now to FIG. 2, the electric motor 12 generally includes the stator 18 and the rotor 20 mentioned above. The stator 18 is positioned around the rotor 20 with an air gap 22 in between the stator 18 and the rotor 20. When in operation, the rotor 20 generally rotates about a drive shaft 21, and the stator 18 remains stationary. The stator 18 includes a plurality of windings 24 separated by gaps. Each winding 24 has a winding tip 26.

When in operation, the electric motor 12 has a temperature, and as such, requires cooling. As explained above, the cooling is achieved by providing the coolant to the stator 18, referred to as the stator flow 28, and to the rotor 20, referred to as the rotor flow 29. The stator flow 28 generally flows to the winding tips 26. The rotor flow 29 flows to the rotor 20 through the gaps between the plurality of windings 24. When the rotor flow 29 comes into contact with the rotor 20, which is rotating as mentioned above, the coolant is spun off of the rotor 20 at a high velocity to the interior of the stator 18, specifically the interior of the windings 24, which is not reached by the stator flow 28. This increases the cooling effectiveness of the coolant.

However, the rotor flow 29 is only necessary when the temperature of the electric motor 12 is above a threshold temperature. The threshold temperature may be dependent upon such factors as the material of the insulation of the stator 18. In one embodiment, the threshold temperature may be between 150 degrees Celsius and 180 degrees Celsius. The temperature of the electric motor 12 generally increases when higher torque and power is required from the electric motor 12. The temperature may be calculated by a controller 50, described in more detail hereinafter, based on such parameters as the torque and/or power of the electric motor 12. Alternatively, the temperature may be measured by a temperature sensor (not shown) or other measuring device located at the electric motor 12. The speed of the coolant pump 14 may be proportional to the temperature of the electric motor 12 such that the rotor flow 29 starts at the appropriate temperature of the electric motor 12, i.e., the threshold temperature.

Figure 3A:
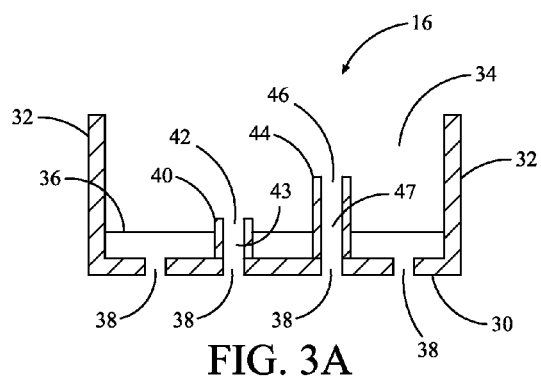
FIGS. 3A-3C are schematic, cross-sectional views of the apparatus of FIG. 1.
Figure 3B:
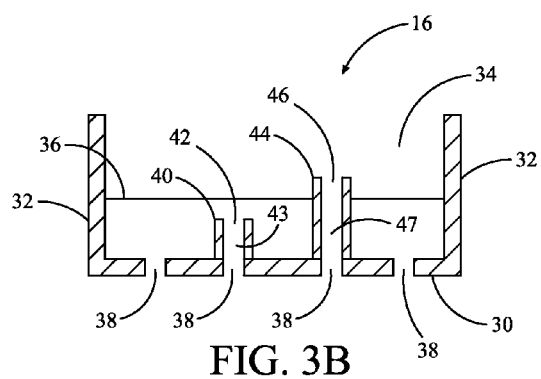
Figure 3C:
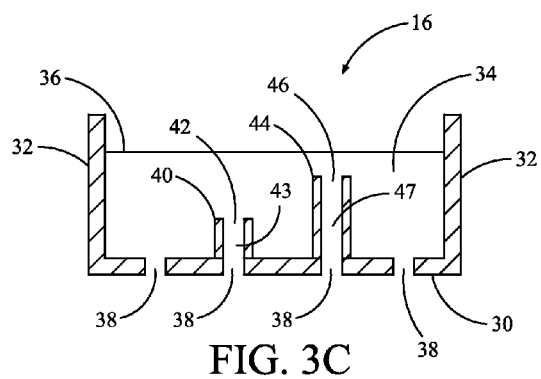

Referring now to FIGS. 3A-3C, the apparatus 16 generally includes a base 30 and at least one wall 32 that define a cavity 34. The cavity 34 is configured to receive and hold the coolant supplied by the coolant pump 14. The coolant within the cavity 34 is filled to a coolant level 36, which may vary depending upon the speed of the coolant pump 14, as mentioned above and described in more detail hereinafter.

The base 30 also defines first openings 38. While four first openings 38 are shown in FIGS. 3A-3C, it should be appreciated that there may be any number of first openings 38. As explained above, the apparatus 16 is located above the electric motor 12. As such, the coolant, or the stator flow 28, is flowable by gravity through some of the first openings 38 to the stator 18, specifically the winding tips 26 as explained above. The first openings 38 may be located in the base 30 such that the coolant may flow directly from the first openings 38 to the winding tips 26. Alternatively, the apparatus 16 may include a tube (not shown) or other passageway to direct the coolant from each of the first openings 38 to the winding tips 26.

The apparatus 16 also includes a first raised member 40 within the cavity 34 that extends from the base 30. While only one first raised member 40 is shown in FIGS. 3A-3C, it should be appreciated that there may be any number of first raised members 40. The first raised member 40 may be, but is not limited to, a pipe, a tube, a platform, or the like. The first raised member 40 defines at least one second opening 42 that is substantially aligned with one of the first openings 38 to form a first passageway 43. Similar to the first openings 38, the coolant, or the rotor flow 29, is flowable by gravity through the first passageway 43 to the rotor 20. In addition, the first raised member 40 and the first passageway 43 may be located within the cavity 34 such that the coolant may flow directly from the first passageway 43 to the rotor 20. Alternatively, the apparatus 16 may include a tube (not shown) or other passageway to direct the coolant from the first passageway 43 to the rotor 20.

The apparatus 16 may further include a second raised member 44 within the cavity 34 that extends from the base 30. While only one second raised member 44 is shown in FIGS. 3A-3C, it should be appreciated that there may be any number of second raised members 44. The second raised member 44 is taller than the first raised member 40, i.e., it extends further from the base 30 than the first raised member 40. As with the first raised member 40, the second raised member 44 may be, but is not limited to, a pipe, a tube, a platform, or the like. The second raised member 44 defines at least one third opening 46 that is substantially aligned with one of the first openings 38 to form a second passageway 47. Similar to the first passageway 43, the coolant, or the rotor flow 29, is flowable by gravity through the second passageway 47 to the rotor 20. The second raised member 44 and the second passageway 47 may be located within the cavity 34 such that the coolant may flow directly from the second passageway 47 to the rotor 20. Alternatively, the apparatus 16 may include a tube (not shown) or other passageway to direct the coolant from the second passageway 47 to the rotor 20.

The second raised member 44 and the second passageway 47 allow for coolant to be progressively provided to the rotor 20 as the temperature of the electric motor 12 increases. It should be appreciated that the apparatus 16 may include any number of raised members, in addition to the second raised member 44, increasing in height from the first raised member 40 to further the progressive supply of coolant to the rotor 20.

As explained above, the coolant level 36 may vary depending upon the speed of the coolant pump 14, which in turn may depend upon such parameters as the temperature of the electric motor 12. Because the first openings 38 are located in the base 30, the coolant is always provided to the stator 18 when the system 10 is operational. However, the varying heights of the first raised member 40 and the second raised member 44 allow the coolant to be selectively supplied to the rotor 20 as the temperature of the electric motor 12, and therefore the speed of the coolant pump 14, increases. The heights are determined, together with the speed of the coolant pump 14, based on the threshold temperature at which the rotor flow 29 is required.

As seen in FIG. 3A, the coolant level 36 is below the first raised member 40 and the second raised member 44. As such, the coolant is only flowable through the first openings 38 to the stator 18. As seen in FIG. 3B, the coolant level 36 is between the first raised member 40 and the second raised member 44. As such, the coolant is flowable through both the first openings 38 and the first passageway 43 to the stator 18 and the rotor 20, respectively. As seen in FIG. 3C, the coolant level 36 is above the second raised member 44, and as such, the coolant is flowable through the first openings 38 to the stator 18, and through the first passageway 43 and the second passageway 47 to the rotor 20.

Referring back to FIG. 1, the system 10 also includes a controller 50 that may be electrically connected to at least one of the coolant pump 14 and the electric motor 12. The controller 50 is configured to control the speed of the coolant pump 14, and therefore the amount of coolant being supplied to the apparatus 16, and the coolant level 36 within the cavity 34 of the apparatus 16. The controller 50 also may be configured to calculate the temperature of the electric motor 12 or to receive the temperature measurement from another device, as explained above.

Figure 4:
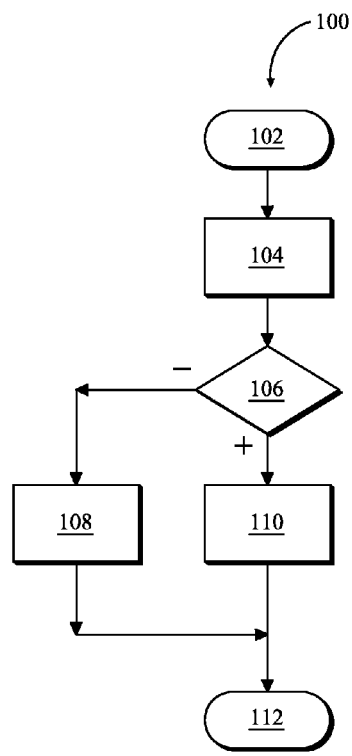
FIG. 4 is a schematic, flow diagram illustrating an exemplary method of cooling the electric motor via the system of FIG. 1.

Referring now to FIG. 4, a method 100 for providing the coolant to the stator 18 and/or the rotor 20 via the system 10 to cool the electric motor 12 is shown. Method 100 begins at step 102 in which the electric motor 12 is in operation and therefore has a temperature.

After step 102, method 100 proceeds to step 104. At step 104, the temperature of the electric motor 12 is determined. As explained above, the temperature may be calculated by the controller 50 based on certain parameters, including, but not limited to, the torque and/or the power provided by the electric motor 12. Alternatively, the temperature may be measured by a temperature sensor or other device, which may then send the subsequent measurement to the controller 50 to be processed.

After step 104, method 100 proceeds to step 106. At step 106, the controller 50 determines if the temperature determined at step 104 is above or below a threshold temperature. As explained above, in one embodiment, the threshold temperature may be between 150 degrees Celsius and 180 degrees Celsius. If the controller 50 determines that the temperature is below the threshold temperature, as indicated by the (−) sign in FIG. 4, method 100 proceeds to step 108. If the controller 50 determines that the temperature is above the threshold temperature, as indicated by the (+) sign in FIG. 4, method 100 proceeds to step 110.

At step 108, the controller 50 sets the coolant pump 14 to a low speed setting such that the coolant level 36 within the cavity 34 does not exceed the first raised member 40. As such, the coolant flows by gravity only to the stator 18 through the first openings 38, as explained above. After step 108, method 100 proceeds to step 112 at which method 100 ends.

At step 110, the controller 50 sets the coolant pump 14 to a high speed setting such that the coolant level 36 within the cavity 34 is above the first raised member 40. As such, the coolant flows by gravity to both the stator 18 and the rotor 20 through the first openings 38 and the first passageway 43, respectively, as explained above.

It should be appreciated that method 100 may include additional steps for increasing the coolant level above any additional raised members, such as the second raised member 44, to achieve a progressive supply of the coolant to the rotor 20, as explained above.

After step 110, method 100 ends at step 112. Method 100 may be consistently repeated while the electric motor 12 is in operation, and therefore requires cooling, in order to account for changes in the temperature of the electric motor 12, as explained above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An apparatus for providing a coolant to a stator and a rotor of an electric motor in a vehicle having a coolant pump, the apparatus comprising:
    a base defining a plurality of first openings through at least one of which the coolant is flowable to the stator;
    at least one wall extending from the base, the base and the at least one wall defining a cavity configured to receive the coolant from the coolant pump; and
    at least one first raised member within the cavity, the at least one first raised member extending from the base and defining at least one second opening substantially aligned with one of the first openings to form at least one first passageway through which the coolant is flowable to the rotor.

2. The apparatus of claim 1 further comprising at least one second raised member within the cavity, the at least one second raised member extending from the base further than the at least one first raised member, the at least one second raised member defining at least one third opening substantially aligned with one of the first openings to form at least one second passageway through which the coolant is flowable to the rotor.

3. The apparatus of claim 1 wherein the at least one first raised member is a platform.

4. The apparatus of claim 1 wherein the at least one first raised member is a pipe.

5. A system for providing a coolant to a stator and a rotor of an electric motor in a vehicle, the system comprising:
    a coolant pump configured to supply the coolant, the coolant pump having a speed that is adjustable;
    an apparatus comprising:
        a base defining a plurality of first openings through at least one of which the coolant is flowable to the stator;
        at least one wall extending from the base, the base and the at least one wall defining a cavity configured to receive the coolant from the coolant pump such that the coolant level is at a coolant level within the cavity; and
        at least one first raised member within the cavity, the at least one first raised member extending from the base and defining at least one second opening substantially aligned with one of the first openings to form at least one first passageway through which the coolant is flowable to the rotor when the coolant level is above the at least one first raised member; and
    a controller configured to adjust the speed of the coolant pump based on at least one parameter such that the coolant level within the cavity is variable.

6. The system of claim 5 wherein the coolant is oil, and the coolant pump is an oil pump.

7. The system of claim 5 wherein the at least one parameter is an operating temperature of the electric motor.

8. The system of claim 7 wherein the controller is configured to increase the speed of the coolant pump such that the coolant level is above the at least one first raised member when the operating temperature of the electric motor exceeds a threshold temperature.

9. The system of claim 8 wherein the threshold temperature is between 150 degrees Celsius and 180 degrees Celsius.

10. The system of claim 5 wherein the at least one first raised member of the apparatus is a platform.

11. The system of claim 5 wherein the at least one first raised member of the apparatus is a pipe.

12. The system of claim 5 wherein the apparatus further comprises at least one second raised member within the cavity, the at least one second raised member extending from the base further than the at least one first raised member, the at least one second raised member defining at least one third opening substantially aligned with one of the first openings to form at least one second passageway through which the coolant is flowable to the rotor when the coolant level is above the at least one second raised member.

13. A method of providing a coolant to a stator and a rotor of an electric motor in a vehicle having a coolant pump and an apparatus located above the electric motor, the apparatus having a base defining a plurality of first openings, at least one wall extending from the base to define a cavity, and at least one first raised member extending from the base and defining a second opening substantially aligned with one of the first openings to form at least one first passageway, the method comprising:
    determining a temperature of the electric motor;
    determining whether the temperature of the electric motor is below or above a threshold temperature;
    if the temperature of the electric motor is below the threshold temperature, then setting the coolant pump to a low speed setting such that the coolant supplied to the apparatus fills the cavity to a coolant level that does not exceed the at least one first raised member, and the coolant flows by gravity through the plurality of first openings to the stator; and
    if the temperature of the electric motor is above the threshold temperature, then setting the coolant pump to a high speed setting such that the coolant level within the cavity is above the at least one first raised member, and the coolant flows by gravity through both the plurality of first openings and the at least one first passageway to the stator and the rotor, respectively.

14. The method of claim 13 wherein the coolant is oil, and the coolant pump is an oil pump.

15. The method of claim 13 wherein the threshold temperature is between 150 degrees Celsius and 180 degrees Celsius.

* * * * *